US008627476B1

(12) United States Patent
Satish et al.

(10) Patent No.: US 8,627,476 B1
(45) Date of Patent: Jan. 7, 2014

(54) ALTERING APPLICATION BEHAVIOR BASED ON CONTENT PROVIDER REPUTATION

(75) Inventors: Sourabh Satish, Fremont, CA (US); Patrick Gardner, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 517 days.

(21) Appl. No.: 12/830,418

(22) Filed: Jul. 5, 2010

(51) Int. Cl.
  *G06F 11/00* (2006.01)
  *G06F 12/14* (2006.01)
  *G06F 12/16* (2006.01)
(52) U.S. Cl.
  USPC ............................................. 726/24; 713/17
(58) Field of Classification Search
  USPC ............. 726/24, 2, 22, 26; 713/187, 188, 189
  See application file for complete search history.

(56) References Cited

U.S. PATENT DOCUMENTS

| 6,769,066 B1* | 7/2004 | Botros et al. ................ 726/23 |
| 2007/0039054 A1* | 2/2007 | Mulla et al. ................ 726/26 |
| 2007/0220607 A1* | 9/2007 | Sprosts et al. ............... 726/24 |
| 2007/0234403 A1* | 10/2007 | Pipal et al. ................... 726/2 |
| 2008/0282338 A1* | 11/2008 | Beer ............................ 726/12 |
| 2009/0144259 A1* | 6/2009 | Sundaresan .................. 707/5 |

OTHER PUBLICATIONS

Martin Rehak; CAMNEP: Agent-Based Network IntrusionDetection System; Year: 2008; ACM; pp. 133-137.*
"Understanding .NET Code Access Security," 24 pages. UB, Jan. 14, 2004.

* cited by examiner

*Primary Examiner* — Mohammad W Reza
*Assistant Examiner* — Monjour Rahim
(74) *Attorney, Agent, or Firm* — Brill Law Office; Jeffrey Brill

(57) ABSTRACT

Incoming network traffic is monitored, and content-based files in the monitored incoming network traffic originating from remote sources are identified. When a specific content-based file originating from a remote source is identified, security information concerning that file is gleaned. This security information comprises at least a security reputation of the remote source from which the file originates. An attempt to open the file is identified, and a security risk rating is determined based on the security information concerning the file. In response to the security risk rating exceeding a given threshold, behavior associated with the attempt to open the file is altered. This altering of behavior can comprise, for example, disabling a scripting engine for the instance of the content processing application attempting to open the file, or altering file system and/or operating system resource access privileges.

20 Claims, 4 Drawing Sheets

ALTERING APPLICATION BEHAVIOR BASED ON CONTENT PROVIDER REPUTATION

TECHNICAL FIELD

This disclosure pertains generally to computer security, and more specifically to protecting computers by altering application behavior based on content provider reputation.

BACKGROUND

As anti-malware systems become better at identifying malicious executable files, malware is more frequently being distributed in non-executable, content-based files that are processed or loaded by application programs. For example, malware is often disguised as content in PDF or other types of media and/or document files, which are opened by specific applications (e.g., Adobe Reader®, Microsoft Word®, Apple Quick Time®, etc.). Frequently, content-based malware infects computers by causing the processing application to run malicious active content, such as JavaScript. This type of malware leverages vulnerabilities in content formats as well as user ignorance to distribute itself and infect computers in this manner. As a specific example, there has recently been a large increase in the amount of malware distributed in PDF files. Due to the complexity of these formats and attack type, such malware often evades traditional signature based detection. It would be desirable to address these issues.

SUMMARY

A content source reputation management system protects a computer system from malicious attacks by altering content processing application behavior, based on at least content provider reputation. More specifically, incoming network traffic is monitored, and content-based files in the monitored incoming network traffic originating from remote sources are identified. The identified content-based files can be downloaded from remote sources, or attached to incoming electronic communications. When a specific content-based file originating from a specific remote source is identified, security information concerning that specific, identified content-based file is gleaned. This gleaned security information comprises at least a security reputation of the specific remote source from which the file originates. The security reputation of the specific remote source can be retrieved from a stored collection of file source reputations, such as a database. An attempt to open a specific, content-based file is identified, and a security risk rating concerning the file is determined, based on gleaned security information concerning the file. Determining the security risk rating concerning the file can be based on just the security reputation of the specific remote source from which the file originates, or on additional security information concerning the file as well, such as the file's size and format. In response to the determined security risk rating concerning the file exceeding a given threshold, behavior associated with the attempt to open the file is altered. This altering of behavior can comprise, for example, blocking the attempt to open the file, disabling a scripting engine for the instance of the content processing application attempting to open the file or altering file system and/or operating system resource access privileges of the instance of the content processing application.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
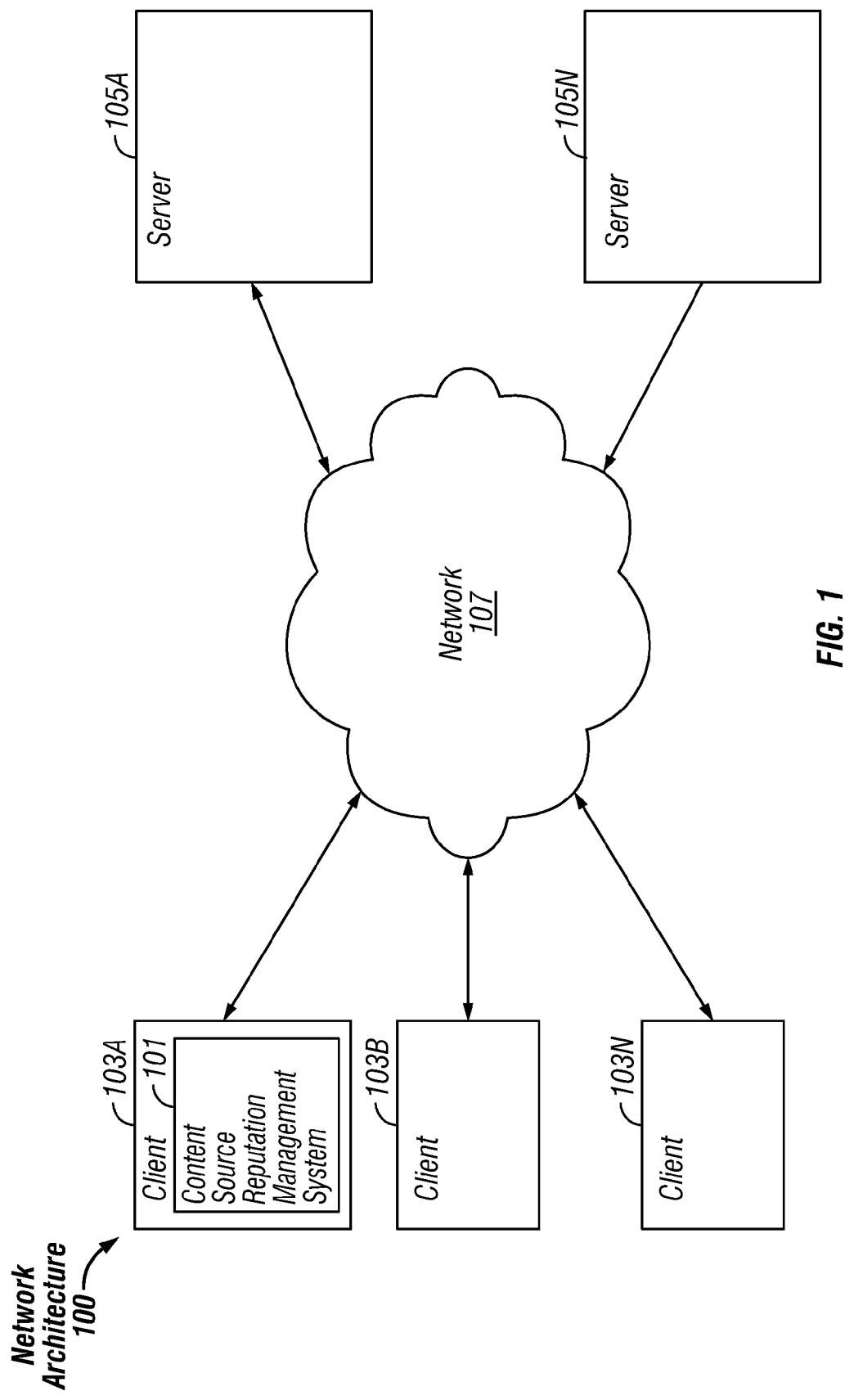
FIG. 1 is a block diagram of an exemplary network architecture in which a content source reputation management system can be implemented, according to some embodiments.

FIG. 1 is a block diagram illustrating an exemplary network architecture 100 in which a content source reputation management system 101 can be implemented. The illustrated network architecture 100 comprises multiple clients 103A, 103B and 103N, as well as multiple servers 105A and 105N. In FIG. 1, the content source reputation management system 101 is illustrated as residing on client 103A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
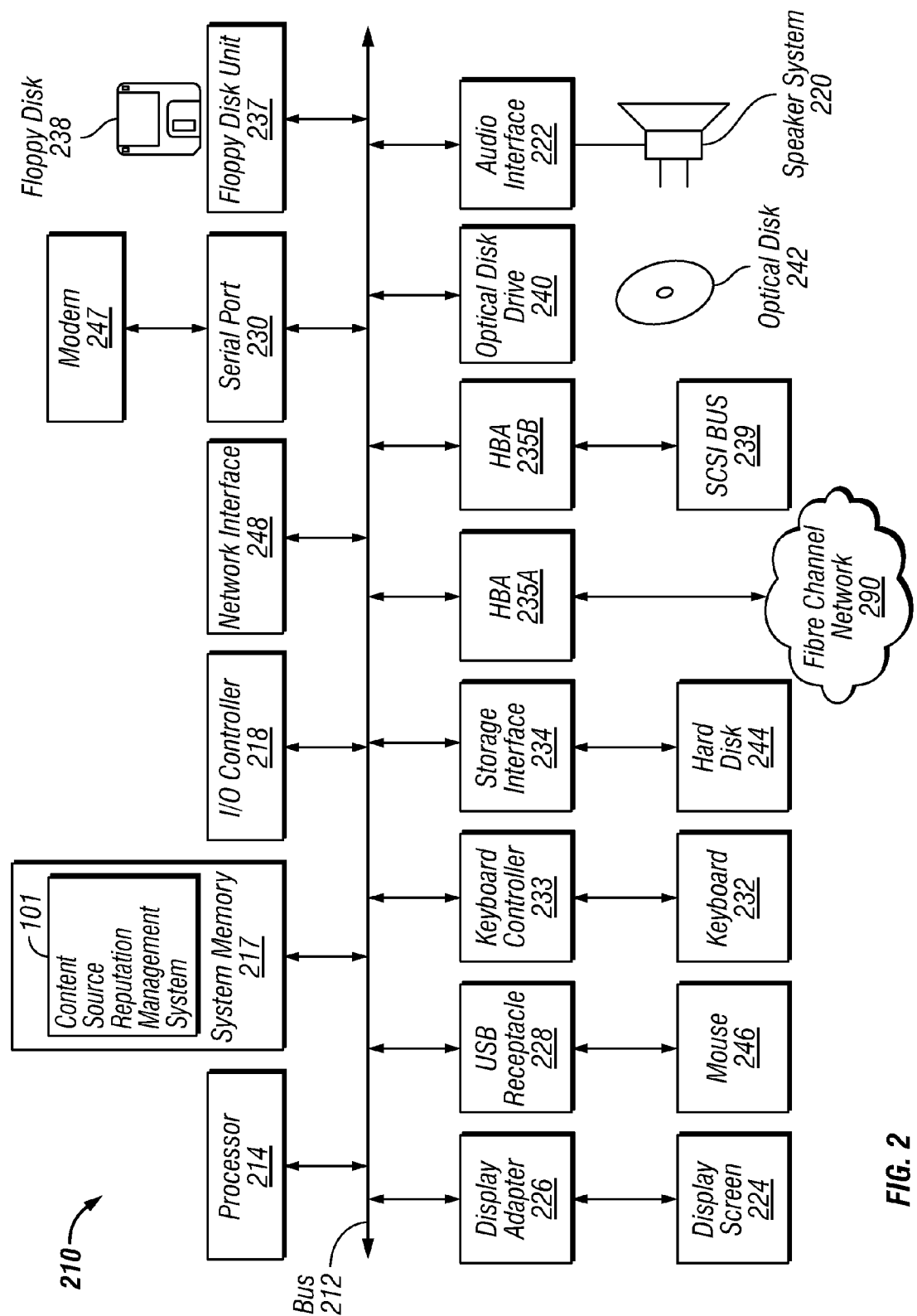
FIG. 2 is a block diagram of a computer system suitable for implementing a content source reputation management system, according to some embodiments.

FIG. 2 is a block diagram of a computer system 210 suitable for implementing a content source reputation management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the content source reputation management system 101 is illustrated as residing in system memory 217. The workings of the content source reputation management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
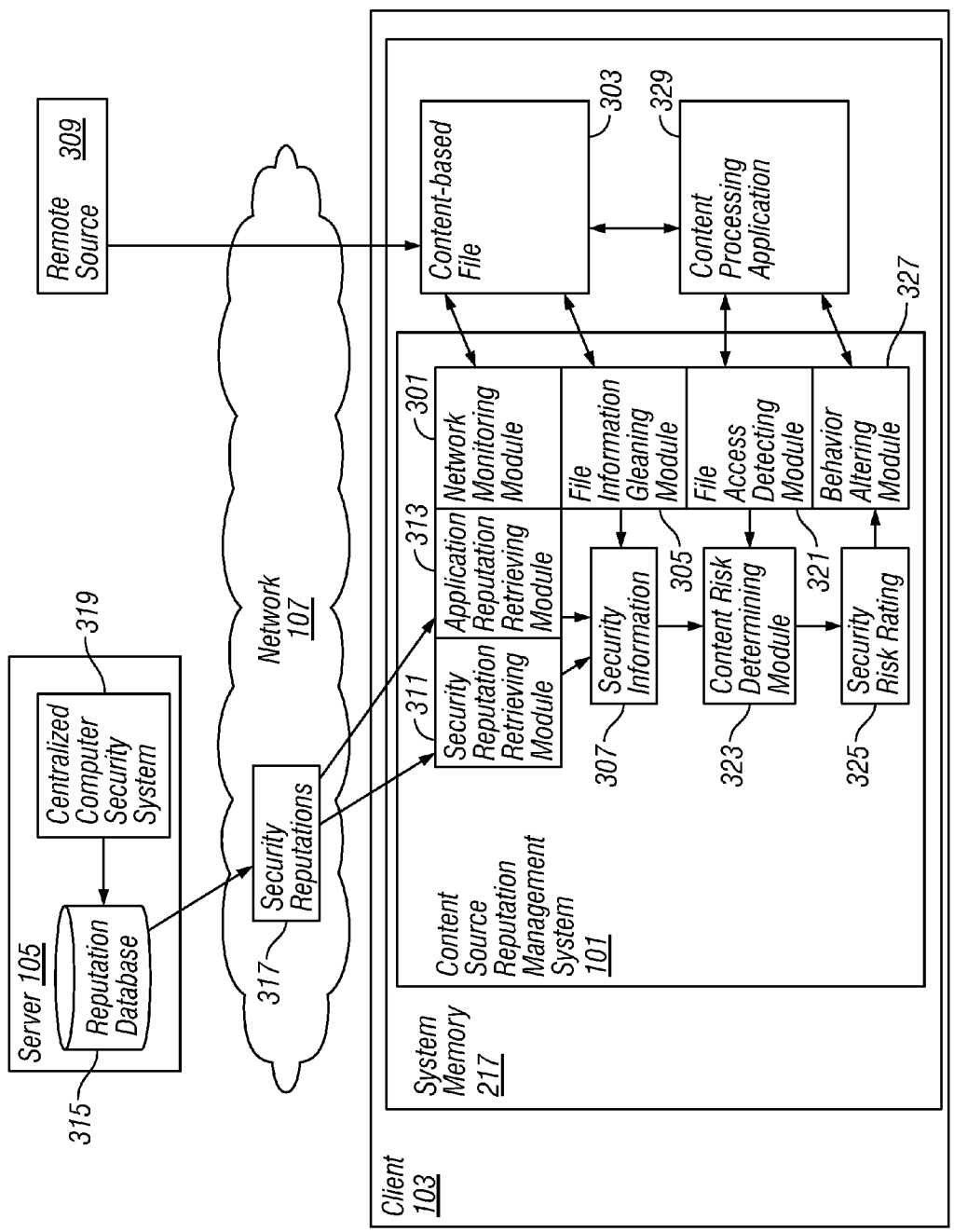
FIG. 3 is a block diagram of the operation of a content source reputation management system, according to some embodiments.

FIG. 3 illustrates the operation of a content source reputation management system 101 residing in the system memory 217 of a client computer 103, according to some embodiments. As described above, the functionalities of the content source reputation management system 101 can reside on a client 103, a server 105, or be distributed between multiple computer systems 210, including within a cloud-based computing environment in which the functionality of the content source reputation management system 101 is provided as a service over a network 107. It is to be understood that although the content source reputation management system 101 is illustrated in FIG. 3 as a single entity, the illustrated content source reputation management system 101 represents a collection of functionalities, which can be instantiated as a single or multiple modules as desired (an instantiation of specific, multiple modules of the content source reputation management system 101 is illustrated in FIG. 3). It is to be understood that the modules of the content source reputation management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the content source reputation management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the content source reputation management system 101 monitors incoming non-executable content-based files 303 entering a user's computer 210, determines whether the content is legitimate or malicious and takes appropriate steps to keep the computer 210 secure based on the results of the determination. More specifically, a network traffic monitoring module 301 of the content source reputation management system 101 monitors incoming network traffic and identifies incoming content-based files 303 in formats such as PDF, MP3, .doc, etc. The network traffic monitoring module 301 can use conventional network monitoring functionality to detect the downloading of files to the computer 210 from remote sources, and the incoming of electronic communications to which files are attached. Where the network traffic monitoring module 301 detects an incoming file in either of these ways (e.g., download from a website, attachment to an email, etc.), it determines whether it comprises a content-based file 303. As used herein, the term "content-based file" 303 means a file primarily storing data, such as text, sound, pictures, video or the like, to be perceived by a human, typically through the use of a content processing application 329 such as a word processor, media player or the like. Content-based files 303 are distinct from executable files, which store executable code (e.g., .exe files, .com files, .dll files, etc.). In different embodiments, different specific file formats can be explicitly included or excluded from the working definition of content-based files 303 as desired (e.g., explicitly include PDF, explicitly exclude .xls, etc.).

Where the network traffic monitoring module 301 identifies a content-based file 303, a file information gleaning module 305 of the content source reputation management system 101 gleans security information 307 concerning the identified content-based file 303. The security information 307 concerning the identified content-based file 303 comprises information that is indicative of whether the file is legitimate or malicious. The file information gleaning module 305 gleans the remote source 309 of the content-based file 303 (e.g., the IP address from which it was downloaded, the sender of the electronic communication with which it was distributed, etc.) as a component of the security information 307. The security information 307 can further comprise additional information concerning the content-based file 303 such as the transmission protocol used for the file transfer, whether the file 303 was encrypted during transmission, whether the file 303 is signed, the size of the file 303, the file format, file attributes (e.g., read-only, system), etc. Where the content-based file 303 is in the form of an attachment to an electronic communication, the file information gleaning module 305 can also glean security information 307 such as the email server, SMTP gateway, email protocol, etc. It is to be understood that in different embodiments, different security information 307 can be gleaned as desired. The file information gleaning module 305 stores the gleaned security information 307 in association with the corresponding content-based file 303 in a secure fashion, such that when the content-based file is processed (e.g., opened) by an associated content processing application 329, the security information can be processed.

In addition, where the network traffic monitoring module 301 identifies a content-based file 303, a source reputation retrieving module 311 of the content source reputation management system 101 retrieves a security reputation 317 associated with the file source 309. More specifically, as illustrated in FIG. 3, a reputation database 315 (or other suitable storage mechanism(s)) can be maintained, storing security reputations 317 concerning various sources 309 of files, such as websites, URLs, Internet Protocol ("IP") addresses for any protocol, email and Instant Messaging ("IM") senders, users of social networking sites (e.g., Facebook® MySpace®, Twitter®) etc. The reputation database 315 can be maintained by a centralized computer security system 319, running, for example, on a server 105. In some embodiments, separate databases 315 are maintained for 1) network based sources 309 such as IP addresses and URLs and 2) user based sources 309 such senders of electronic communications and other distributors of files. Security reputations 317 of network sources 309 can be based on factors such as whether malicious code has been detected as originating from the given source 309. Security reputations 317 of user based sources 309 can be based on factors such as whether given users have been detected sending or otherwise distributing malicious files, SPAM, links to malware URLs, links to phishing sites or other attacks, etc. In any case, the source reputation retrieving module 311 can retrieve the security reputation 317 of the source 309 of a given identified content-based file 303 from the database 315, and add the retrieved security reputation 317 to security information 307 concerning that content-based file 303.

In some embodiments, a database 315 is also maintained storing security reputations 317 of different content processing applications 329, such as readers of different formats of content-based files 303. In such embodiments, where the network traffic monitoring module 301 identifies a content-based file 303, an application reputation retrieving module 313 of the content source reputation management system 101 can retrieve a security reputation 317 of a specific content processing application 329 associated with the format of the identified content-based file 303 (e.g., Adobe Reader® where a PDF file 303 is identified). The application reputation retrieving module 313 can then add the retrieved security reputation 317 to security information 307 concerning that content-based file 303. The security reputations 317 of given content processing applications 329 can be based on factors such as whether the application 329 is from a trusted vendor, has any known security vulnerabilities, etc.

Typically, where one or more reputation databases 315 are maintained by a centralized computer security system 319, the centralized computer security system 319 receives corresponding information concerning file sources (and/or content processing applications 329) from a plurality of clients 103 over time. Such information can be determined by, for example, a conventional anti-malware system (not illustrated). It is to be understood that the functionality described herein is not tied to any specific methodology or instantiation as to how security reputations 317 are calculated, which can be done according to conventional or other techniques as desired.

A file access detecting module 321 of the content source reputation management system 101 detects when attempts are made to open content-based files 303, and a content risk determining module 323 of the content source reputation management system 101 uses the associated security information 307 to determine security risk ratings 325 for specific content-based files 303. To determine the security risk rating 325 for a specific content-based file 303, the content risk determining module 323 uses the security reputation 317 of the source 309 of the file 303, as well as optionally other factors in the security information 307 associated with the file 303. The lower the security reputation 317 of the source 309, the riskier the content-based file 303 is determined to be. The content risk determining module 323 can also adjust the security risk rating 325 based on other factors in the security information 307 associated with the file 303. For example, a file 303 transmitted using a secure protocol is considered less risky than otherwise, and a file 303 encrypted during transmission is considered less risky than one transmitted in the clear. Likewise, a signed file 303 is typically considered less risky than an unsigned one. The specific file format can be taken into account as well (e.g., PDF, .doc, etc.). For example, files 303 of given formats can be expected to be within given size ranges, and a file 303 that is outside of a specific range for its format can be considered riskier than those within the range. Additionally, the security reputation 317 of a content processing application 329 associated with the file format can be taken into account. Where the content-based file 303 is in the form of an attachment to an electronic communication, security information 307 such as the email server, SMTP gateway, email protocol, etc., can be utilized by the content risk determining module 323 in adjusting the security risk rating 325. It is to be understood that the exact security information 307 to use to determine the security risk rating 325 of a given file 303 is a variable design parameter, as is any weightings assigned to different factors.

A behavior altering module 327 of the content source reputation management system 101 can alter the behavior associated with the openings of given content-based files 303, responsive to their associated security risk ratings 325. For example, where the security risk rating 325 of a given content-based file 303 exceeds a given threshold, the behavior altering module 327 can block the opening of the content-based file 303 altogether, or alter the privileges and/or setting associated with the file 303 in order to alter its behavior (e.g., lower privileges, selectively disable settings to minimize potential damage from an attack/prevent an attack, etc.). For example, certain known exploits in Adobe Reader® allow a malicious PDF file 303 to carry out an attack on the computer 210 on which it is opened. These attacks typically involve the PDF file 303 utilizing JavaScript. Therefore, where the security risk rating 325 of a given PDF file 303 exceeds a given threshold, the behavior altering module 327 can disable the JavaScript engine for the instance of Adobe Reader® opening the file 303. This can be achieved under Microsoft Windows® via the registry settings, more specifically by setting the value of the registry key HKEY_CURRENT_USER\ Software\ Adobe\Acrobat Reader\9.0\JSPrefs\bEnableJS to 0 (it is to be understood that the exact name of the key can vary between versions of Microsoft Windows® and Abode Reader®). Another way to disable JavaScript access is to patch the process memory location to disable JavaScript engine functionality dynamically for the particular instance of Adobe Reader® processing the risky file 303, thereby leaving JavaScript enabled for other files 303 that are trusted. Selectively disabling the JavaScript engine for high risk files 303 prevents the use by these files 303 of PDF exploits that use JavaScript to attack the user's computer 210. The JavaScript engine can be disabled for other content processing applications 329 processing other file formats in a similar manner. Additionally, the JavaScript engine can be disabled for applications such as Internet browsers that load content processing applications 329 as plug-ins, where the security risk rating 325 of a content-based file 303 being opened exceeds a given threshold. Script processing engines for scripting formats other than JavaScript can be selectively disabled in a similar manner.

The behavior altering module 327 can also alter the behavior of content-based files 303 with security risk ratings 325 exceeding a given threshold in other ways. In some embodiments, the behavior altering module 327 can simply lower the access privileges or restrict some actions for the instance of the content processing application 329 opening the file 303. More specific behavior altering actions can be taken as well, such as preventing the instance of the content processing application 329 from creating new files, editing files, or opening and/or accessing additional file system and/or operating system resources. In various embodiments, the behavior altering module 327 can modify settings and privileges, as well as employ conventional or other types of sandboxing techniques, to restrict the actions, behaviors and file and other system access available in association with the processing of content-based files 303 with security risk ratings 325 exceeding associated thresholds. It is to be understood that specifically what behavior altering steps to apply in response to specific security risk ratings 325 for specific files 303 of specific formats can vary between embodiments, as can the values of given thresholds beyond which to take such actions.

Figure 4:
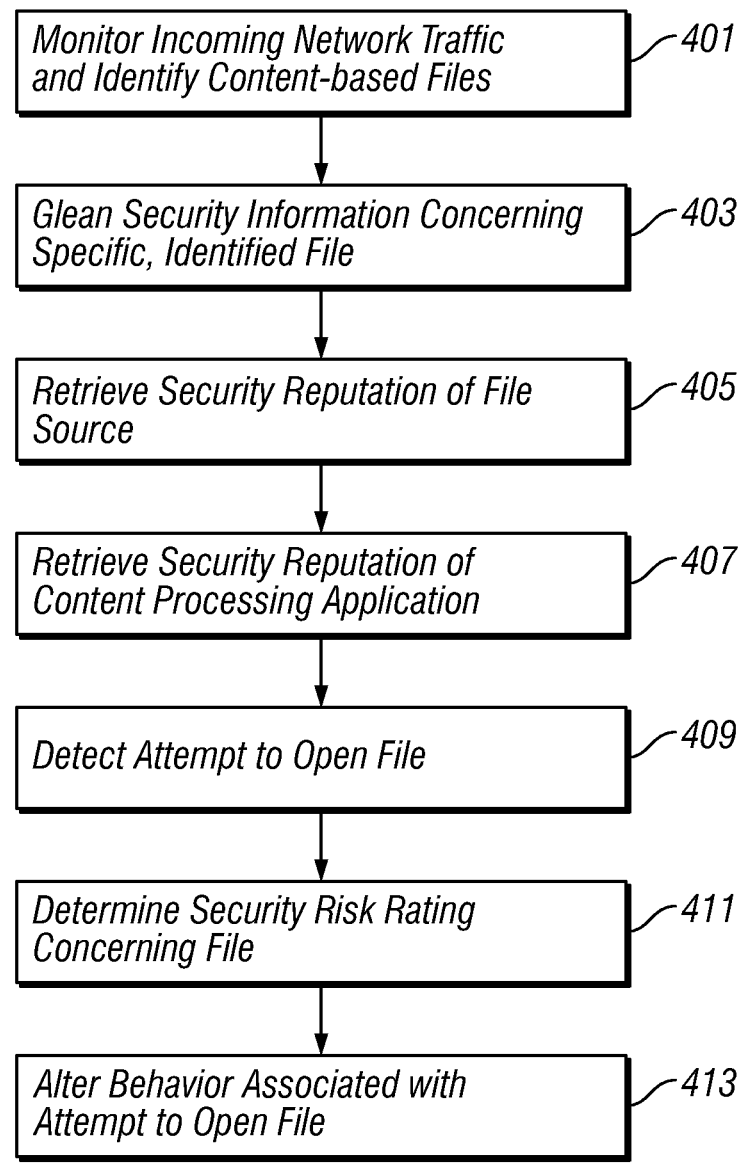
FIG. 4 is a flowchart of the operation of a content source reputation management system, according to some embodiments.

FIG. 4 illustrates steps for the operation of a content source reputation management system 101 (FIG. 1), according to some embodiments. The network traffic monitoring module 301 (FIG. 3) of the content source reputation management system 101 (FIG. 1) monitors incoming network traffic, and identifies 401 content-based files 303 (FIG. 3) originating from remote sources 309 (FIG. 3). When a specific content-based file 303 (FIG. 3) originating from a specific remote source 309 (FIG. 3) is identified, the file information gleaning module 305 (FIG. 3) of the content source reputation management system 101 (FIG. 1) gleans 403 security information 307 (FIG. 3) concerning the file 303 (FIG. 3). This gleaned security information (FIG. 3) comprises at least a security reputation 317 (FIG. 3) of the remote source 309 (FIG. 3) from which the file 303 (FIG. 3) originates. The source reputation retrieving module 311 (FIG. 3) of the content source reputation management system 101 (FIG. 1) can retrieve 405 the security reputation 317 (FIG. 3) from a reputation database 315 (FIG. 3). Additionally, the application reputation retrieving module 313 (FIG. 3) of the content source reputation management system 101 (FIG. 1) can retrieve 407 a security reputation 317 (FIG. 3) of a specific content processing application 329 (FIG. 3) associated with the format of the content-based file 303 (FIG. 3) from the reputation database 315 (FIG. 3). The file access detecting module 321 (FIG. 3) of the content source reputation management system 101 (FIG. 1) detects 409 an attempt to open the specific, content-based file 303 (FIG. 3), and the content risk determining module 323 (FIG. 3) of the content source reputation management system 101 (FIG. 1) determines 411 a security risk rating 323 (FIG. 3) concerning the file 303 (FIG. 3) based on gleaned security information 307 (FIG. 3). In response to the determined security risk rating (FIG. 3) concerning the file 303 (FIG. 3) exceeding a given threshold, the behavior altering module 327 (FIG. 3) of the content source reputation management system 101 (FIG. 1) alters 413 behavior associated with the attempt to open the file 303 (FIG. 3).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for protecting a computer system from malicious attacks by altering content processing application behavior based on at least content provider reputation, the method comprising the steps of:
   monitoring, by at least one computer, incoming network traffic;
   identifying, by the at least one computer, content-based files in the monitored incoming network traffic, the content-based files originating from remote sources and being accessible using a processing application;
   gleaning, by the at least one computer, security information concerning a specific, identified content-based file originating from a specific remote source, comprising receiving from a security server a security reputation of the specific remote source of the specific, identified content-based file;
   detecting, by the at least one computer, an attempt to open the specific, identified content-based file with the processing application;
   determining, by the at least one computer, a security risk rating concerning the specific, identified content-based file, based on security information concerning the specific, identified content-based file comprises at least the security reputation of the specific remote source of the specific, identified content-based file; and
   altering, by the at least one computer, behavior associated with the attempt to open the specific, identified content-based file, in response to the determined security risk rating concerning the specific, identified content-based file exceeding a given threshold.

2. The method of claim 1 wherein identifying, by the at least one computer, content-based files in the monitored incoming network traffic further comprises:
   identifying, by the at least one computer, a content-based file being downloaded from a remote source.

3. The method of claim 1 wherein identifying, by the at least one computer, content-based files in the monitored incoming network traffic further comprises:
   identifying, by the at least one computer, an incoming electronic communication from a remote user with at least one content-based file as an attachment.

4. The method of claim 1 wherein gleaning, by the at least one computer, security information concerning a specific, identified content-based file originating from a specific remote source further comprises:

retrieving, by the at least one computer, the security reputation of the specific remote source of the specific content-based file from a stored collection of reputations of a plurality of file sources.

5. The method of claim 1 wherein determining, by the at least one computer, a security risk rating concerning the specific, identified content-based file, based on security information concerning the specific, identified content-based file further comprises:

determining, by the at least one computer, a security risk rating concerning the specific, identified content-based file, based on the security reputation of the specific remote source of the specific, identified content-based file and at least some additional security information concerning the specific, identified content-based file.

6. The method of claim 5 wherein the at least some additional security information concerning the specific, identified content-based file further comprises:

at least a size and a format of the specific, identified content-based file.

7. The method of claim 1 wherein altering, by the at least one computer, behavior associated with the attempt to open the specific, identified content-based file, in response to the determined security risk rating concerning the specific, identified content-based file exceeding a given threshold further comprises:

blocking, by the at least one computer, the attempt to open the specific, identified content-based file, in response to the determined security risk rating concerning the specific, identified content-based file exceeding a given threshold.

8. The method of claim 1 wherein altering, by the at least one computer, behavior associated with the attempt to open the specific, identified content-based file, in response to the determined security risk rating concerning the specific, identified content-based file exceeding a given threshold further comprises:

disabling, by the at least one computer, a scripting engine, for an instance of a content processing application attempting to open the specific, identified content-based file, in response to the determined security risk rating concerning the specific, identified content-based file exceeding a given threshold.

9. The method of claim 1 wherein altering, by the at least one computer, behavior associated with the attempt to open the specific, identified content-based file, in response to the determined security risk rating concerning the specific, identified content-based file exceeding a given threshold further comprises:

altering, by the at least one computer, file system access privileges of an instance of a content processing application attempting to open the specific, identified content-based file, in response to the determined security risk rating concerning the specific, identified content-based file exceeding a given threshold.

10. The method of claim 1 wherein altering, by the at least one computer, behavior associated with the attempt to open the specific, identified content-based file, in response to the determined security risk rating concerning the specific, identified content-based file exceeding a given threshold further comprises:

altering, by the at least one computer, operating system resource access privileges of an instance of a content processing application attempting to open the specific, identified content-based file, in response to the determined security risk rating concerning the specific, identified content-based file exceeding a given threshold.

11. At least one non-transitory computer readable storage medium storing a computer program product for protecting a computer system from malicious attacks by altering content processing application behavior based on at least content provider reputation, the computer program product comprising:

program code for monitoring incoming network traffic;

program code for identifying content-based files in the monitored incoming network traffic, the content-based files originating from remote sources and being accessible using a processing application;

program code for gleaning security information concerning a specific, identified content-based file originating from a specific remote source, comprising receiving from a security server a security reputation of the specific remote source of the specific, identified content-based file;

program code for detecting an attempt to open the specific, identified content-based file with the processing application;

program code for determining a security risk rating concerning the specific, identified content-based file, based on security information concerning the specific, identified content-based file comprising at least the security reputation of the specific remote source of the specific, identified content-based file; and program code for altering behavior associated with the attempt to open the specific, identified content-based file, in response to the determined security risk rating concerning the specific, identified content-based file exceeding a given threshold.

12. The computer program product of claim 11 wherein the program code for identifying content-based files in the monitored incoming network traffic further comprises:

program code for identifying a content-based file being downloaded from a remote source.

13. The computer program product of claim 11 wherein the program code for identifying content-based files in the monitored incoming network traffic further comprises:

program code for identifying an incoming electronic communication from a remote user with at least one content-based file as an attachment.

14. The computer program product of claim 11 wherein the program code for gleaning security information concerning a specific, identified content-based file originating from a specific remote source further comprises:

program code for retrieving the security reputation of the specific remote source of the specific content-based file from a stored collection of reputations of a plurality of file sources.

15. The computer program product of claim 11 wherein the program code for determining a security risk rating concerning the specific, identified content-based file, based on security information concerning the specific, identified content-based file further comprises:

program code for determining a security risk rating concerning the specific, identified content-based file, based on the security reputation of the specific remote source of the specific, identified content-based file and at least some additional security information concerning the specific, identified content-based file.

16. The computer program product of claim 15 wherein the at least some additional security information concerning the specific, identified content-based file further comprises:

at least a size and a format of the specific, identified content-based file.

17. The computer program product of claim 11 wherein the program code for altering behavior associated with the attempt to open the specific, identified content-based file, in response to the determined security risk rating concerning the specific, identified content-based file exceeding a given threshold further comprises:

program code for disabling a scripting engine, for an instance of a content processing application attempting to open the specific, identified content-based file, in response to the determined security risk rating concerning the specific, identified content-based file exceeding a given threshold.

18. The computer program product of claim 11 wherein the program code for altering behavior associated with the attempt to open the specific, identified content-based file, in response to the determined security risk rating concerning the specific, identified content-based file exceeding a given threshold further comprises:

program code for altering file system access privileges of an instance of a content processing application attempting to open the specific, identified content-based file, in response to the determined security risk rating concerning the specific, identified content-based file exceeding a given threshold.

19. The computer program product of claim 11 wherein the program code for altering behavior associated with the attempt to open the specific, identified content-based file, in response to the determined security risk rating concerning the specific, identified content-based file exceeding a given threshold further comprises:

program code for altering operating system resource access privileges of an instance of a content processing application attempting to open the specific, identified content-based file, in response to the determined security risk rating concerning the specific, identified content-based file exceeding a given threshold.

20. A computer system configured to protect against malicious attacks by altering content processing application behavior based on at least content provider reputation, the computer system comprising:

a processor;

system memory;

a network monitoring module to monitor incoming network traffic, and to identify content-based files in the monitored incoming network traffic, the content-based files originating from remote sources and being accessible using a processing application;

a file information gleaning module to glean security information concerning a specific, identified content-based file originating from a specific remote source, comprising receiving from a security server a security reputation of the specific remote source of the specific, identified content-based file;

a file access detecting module to detect an attempt to open the specific, identified content-based file with the processing application;

a content risk determining module to determine a security risk rating concerning the specific, identified content-based file, based on security information concerning the specific, identified content-based file comprising at least the security reputation of the specific remote source of the specific, identified content-based file; and a behavior altering module to alter behavior associated with the attempt to open the specific, identified content-based file, in response to the determined security risk rating 27 concerning the specific, identified content-based file exceeding a given threshold.

\* \* \* \* \*